Jan. 5, 1971 R. E. WARNER 3,552,775
TRAILER HITCH COUPLING
Filed March 6, 1968 2 Sheets-Sheet 2
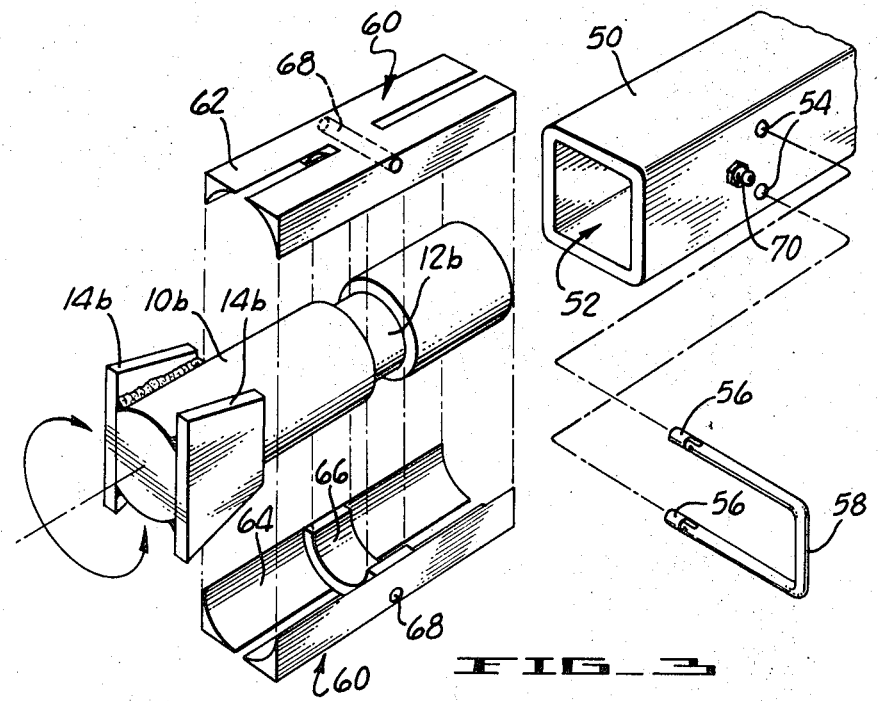
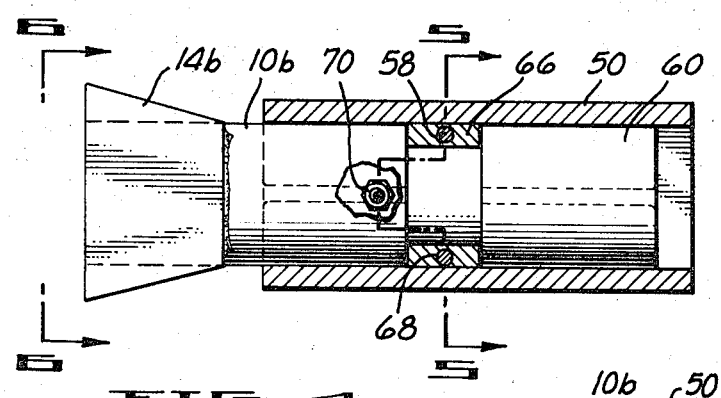
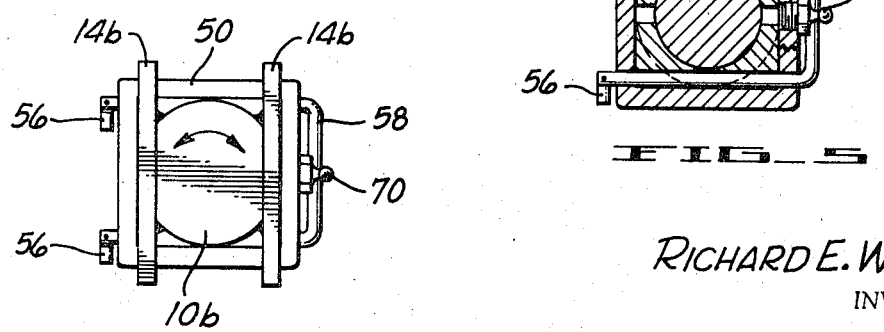
RICHARD E. WARNER
INVENTOR.
BY Townsend & Townsend
ATTORNEYS

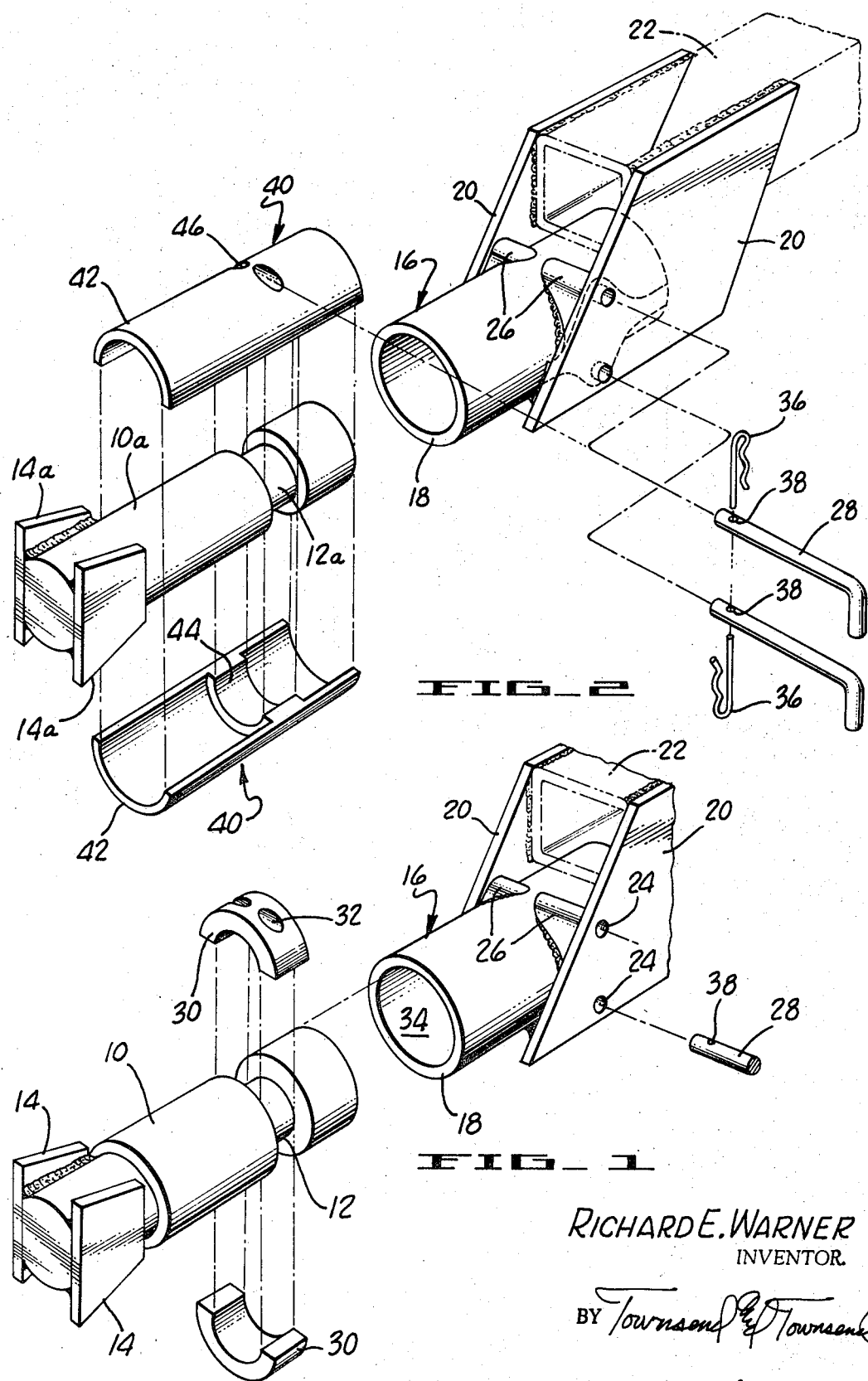

United States Patent Office 3,552,775
Patented Jan. 5, 1971

3,552,775
TRAILER HITCH COUPLING
Richard E. Warner, 1530 Edgewood Drive,
Lodi, Calif. 95240
Filed Mar. 6, 1968, Ser. No. 711,022
Int. Cl. B60d 1/14
U.S. Cl. 280—492                                  5 Claims

ABSTRACT OF THE DISCLOSURE

A trailer coupling device for use with a conventional ball hitch in which a cylindrical pintle having an annular groove is assembled with adapter plates having annular projections on their inner surfaces for engaging the groove. The outer surfaces of the adapter plates are shaped to conform the assembly to the shape and size of the receiver on a towing vehicle. Lock pins pass through the receiver and the adapter plates to retain the pintle in place in the receiver while permitting it to rotate within the adapter plates.

---

This invention relates to coupling devices, and, more particularly, to a coupling device to be used in connection with trailer hitches.

Trailer hitches, that is, coupling devices between automobiles and trailers, are well-known. Conventional trailer hitches merely provide a coupling between the automobile and the trailer, the coupling permitting relative movement of the automobile and trailer during driving and parking. This is accomplished in the conventional trailer hitch by means of a ball and socket arrangement. The conventional ball and socket mount permits a large amount of relative angular movement in a horizontal plane, i.e., in turning and parking, between the automobile and the trailer. Only a limited amount of relative movement in a vertical plane, i.e., relative twisting, is permitted by the usual ball and socket mount.

Also well-known in the prior art are load-leveling and load-stabilizing trailer hitches. These hitches utilize spring bars or leaf springs of various kinds mounted on or adjacent the ball hitch. Load-leveling trailer hitches are used to form a bridge across the trailer coupling thus tending to raise the rear of the car and to transfer some of the trailer tongue load to the front of the towing vehicle and also to the trailer wheels. Load-stabilizing trailer hitches are used to overcome the tendency of the trailer to sway or rock.

Because of the use of the spring bars or other means of spring loading in load-leveling and load-stabilizing trailer hitches, the amount of relative angular movement in a vertical plane between the automobile and the trailer is limited considerably. As a result, the overturning of a trailer often causes the automobile to be overturned as well or may result in serious damage to the automobile frame, the trailer tongue frame, or both.

The present invention was designed to overcome the inability of conventional trailer hitches to permit relative angular movement in a vertical plane between the trailer and the automobile.

The coupling device of the present invention permits the continued use of conventional trailer hitches and the utilization of the features of such hitches including load leveling and load stabilization and combines with such devices an added feature permitting relative angular movement between the trailer and the towing vehicle. The coupling of the present design also permits a trailer hitch attached to such a coupling to be used with any of the various designs of receiving elements affixed to the draw bar or tow bar of an automobile or other vehicle.

The coupling device includes a cylindrical pintle having an annular groove therein, one end of the pintle being adapted for connection to a trailer hitch mount. The pintle is received within the receiving element of the drawbar or towbar normally affixed to the towing vehicle. In its simplest form the outside diameter of the pintle just fits the inside diameter of the receiving element. The pintle is further provided with an annular split ring which fits within the annular groove. These split rings are provided with slots or holes therein to accommodate pins which pass through and are locked into the receiving element.

Thus when the pintle is held within the receiving element, the lock pins hold the split rings and the pintle may therefore rotate within the receiving element and be held by the split rings which are retained against movement by the lock pins.

In the case in which the inside diameter of the receiving element is larger than the outside diameter of the pintle, a pair of lock plates, each semi-cylindrical in shape, and each having an annular projection complementary to the annular groove on the pintle on the inner surface thereof is provided. These plates fit around the pintle with the annular projection engaged within the groove. The outside diameter of the plate matches the inside diameter of the receiving element so that the pintle with the adapter plates surrounding it enters into and is snugly received within the receiving element. The adapter plates are provided with holes or slots within which the lock pins are received for holding the adapter plates and the pintle against withdrawal from the receiving element.

Some towing vehicles are provided with a square, tubular towbar or drawbar terminal. The coupling device of the present invention may therefore be provided with adapter plates having an inner surface which engages the outside diameter of the pintle and having an outer surface which is complementary to the inside bore of the tubular socket. When these adapter plates are engaged with the pintle, a substantially square configuration is attained so that the pintle with its adapter plates is snugly received within the hollow square receiving element and locked in place in the same manner with lock pins. The pintle is then free to rotate inside the adapter plates secured within the square opening.

Thus it may be seen that the coupling device of the present invention not only serves to permit relative angular movement around a horizontal axis between the towing vehicle and the trailer in order to prevent overturning of the towing vehicle should the trailer overturn, but also permits switching a trailer mount from a vehicle equipped with one shape and size of receiver to another vehicle equipped with a receiver of different shape and size, whether the receiver has a square, round, rectangular, or even tapered socket.

In the drawings:

FIG. 1 is an exploded perspective view of the coupling device of the present invention;

FIG. 2 is an exploded perspective view of another embodiment of the invention showing the lock pins in full detail;

FIG. 3 is an exploded perspective view showing the use of the invention with a receiver having a square shape;

FIG. 4 is an elevation of the invention in partial cross section;

FIG. 5 is a section taken along line 5—5 in FIG. 4; and

FIG. 6 is a view taken along line 6—6 in FIG. 4.

Referring now more particularly to the drawings in which the same reference numerals represent identical elements in each of the several views, one embodiment of the invention in its simplest form is shown in FIG. 1. The pintle 10 is an elongate cylindrical member having annular groove 12 near one end thereof. At the other end of the pintle 10, there is provided a pair of mounting plates 14 upon which a conventional trailer hitch, not shown, may be mounted. The mounting plates 14 are preferably welded to the end of the pintle in order to make a more solid piece. The receiving element 16 comprises the terminus of the automobile tow bar (not separately shown). The receiving element 16 comprises a receiving socket 18 secured to reinforcing plates 20 which are in turn welded or otherwise fastened to the end 22 of the automobile tow bar. The reinforcing plates 20 have holes 24 bored therethrough to accommodate the lock pins. Depending upon the particular configuration of the receiving socket 18 the bores 24 pass through both reinforcing plates 20 and the walls of the receiving socket 18. Reinforcing gussets 26 may be provided between the plates 20 and the walls of the socket 18 so that the lock pins 28 which pass into the bores 24 are fully supported along their entire length.

Annular rings 30 having bores 32 therethrough which correspond with the bores 24 through the receiving structure fit into the groove 12. Their dimensions are chosen so that the outsoide diameter of the rings 30, when they are placed in the groove, corresponds to the outside diameter of the pintle 10. Thus, when the pintle, having a pair of annular rings inserted in the groove 12, is inserted into the bore 34 of the receiving socket 18, and the bores 32 lined up with the bores 24, the lock pins 28 may be inserted through the receiving element and the annular rings 30. Thus, the pintle is restrained from longitudinal movement but may rotate within the reciving socket 18 by rotation against the annular rings.

FIG. 2 illustrates another embodiment of the present invention and, in particular, illustrates how a pintle, the outside diameter of which is smaller than the receiving socket of the receiving element, may be adapted to fit the receiving element. In FIG. 2, the pintle 10a has the same basic configuration as the pintle 10 illustrated in FIG. 1. This pintle 10a is provided with a groove 12a at one end thereof and with mounting plates 14a at the other end for the mounting of the conventional trailer hitch. The receiving element in FIG. 2 is identical with that of FIG. 1. Because of the difference between the inside diameter of the receiving socket bore 34 and the outside diameter of the pintle 10a, provision must be made for adapting the pintle to fit within the bore 34. This is accomplished in the present invention by means of adapter plates 40.

These adapter plates comprise a hemicylindrical plate 42 provided with an annular rib 44 on the inner surface of the adapter plate 40 and with a transverse bore 46 the same diameter as bore 24 in the receiving element reinforcing structure. The annular rib 44 corresponds in dimensions to the annular groove 12a of the smaller diameter pintle 10a. A pair of adapter plates 40 is assembled to the pintle 10a and the assembly inserted into the receiving socket bore 34 until the bores 46 are aligned with the bores 24 so that the lock pins 28 may be inserted through the receiving element and the adapter plates. When the lock pins are inserted through the receiving element, spring type retaining clip 36 may be inserted into the retaining clip holes 38 at the ends of the lock pins 28; thus, the smaller diameter pintle is accommodated in the large diameter receiving element bore, is locked in place so that it cannot be removed, but is free to rotate on the inside surface 48 of the adapter plates 40.

Still another embodiment of the present invention is illustrated in FIG. 3. This embodiment illustrates the adaptability of a cylindrical pintle 10b to insertion and use with a square tube receiving element 50 of the type which is in wide use on towing vehicles. The square tube element 50 has a substantially square inside bore 52 into which the pintle 10b must be inserted. Adapter plates designed to accommodate the cylindrical pintle 10b to the square inside bore of the receiving element are shown generally at 60. These adapter plates have an outer surface 62 substantially the shape of the square inside bore 52 of the tubular receiving element 50. The inner surface 64 of the adapter plates is substantially cylindrical in order to fit the outside diameter of the pintle 10b. The inner surface 64 is provided with an annular rib 66 which will fit within the annular groove 12b.

A pair of adapter plates 60 may be assembled around the outside of the pintle 10b with the annular rib 66 engaged within the groove 12b. The entire assembly may then be inserted within the bore 52 of the square tube element until the transverse bores 68 are aligned with the bores 54 which pass through the side walls of the receiving element 50. A variation from the individual lock pins 28 is illustrated in FIG. 3. These lock pins comprise a U-shaped rod 58, the ends of the legs of which are provided with pivotal tips 56. When the tips 56 are aligned with the legs of the U-shaped rod, the rod may be inserted in the bores 54 passing through the bores 68 of the adapter plate 60 until the tips exit through the opposite wall of the receiving element. The pivotally mounted tips will then pivot down by gravity thus locking the U-bolt 58 in place within the receiving element 50. Thus, the pintle 10b is securely locked against axial movement although it is free to rotate on the bearing surface 64 of the adapter plate 60. In order to prevent excessive wear during towing of a trailer, the receiving element may be provided with a grease fitting 70 permitting the forcing of grease into the assembly for lubrication of the parts.

These and other modifications of my invention may be practiced, it being understood that the form of my invention as described above is to be taken as a preferred example of the same. Such description has been by way of illustration and example for purposes of clarity and understanding. Changes and modifications may be made without departing from the spirit of my invention as limited only by the scope of the appended claims.

I claim:

1. A coupling device for connecting a trailer hitch mount to the receiving element of a towing vehicle comprising: an elongate cylindrical pintle, means for affixing a trailer hitch mount to one end thereof, said pintle having an annular groove therein, means for adapting the outside diameter of the pintle to fit the inside dimensions of the receiving element, said adapting means provided with an annular projection to engage the annular groove, and means for locking the adapting means within the receiving element so that the pintle is restrained from relative longitudinal movement while free to rotate relative to the receiver.

2. The coupling device of claim 1 wherein said locking means comprises a rod passing through the receiving element and the adapting means, and latch means at one end of the rod for retaining the rod in place until release of the latch.

3. The coupling device of claim 1 wherein the adapting means comprises a plurality of plates, each plate having one surface conforming to the shape of the pintle and the opposite surface substantially flat so that when a pair of plates is assembled on a pintle, the assembly may be inserted in a receiving element having at least two parallel inner surfaces.

4. A coupling device for use with a trailer hitch comprising: a receiving element affixed to the draw bar of a towing vehicle, said receiving element having a cylindrical socket therein, a cylindrical pintle adapted to be inserted in said socket in the receiving element, said pintle having an annular groove therein, a split annular ring received in the groove, each half of said ring having an opening therein for receiving a lock pin, and a lock pin passing through the receiving element and the ring halves so that the pintle is prevented from moving axially relative to the receiving element but may rotate therein.

5. The coupling device of claim 4 wherein the lock pin is provided with latch means at the ends of the legs thereof for locking the pin in the receiving element and permitting quick removal thereof.

References Cited

UNITED STATES PATENTS

| | | | |
|---|---|---|---|
| 1,015,906 | 1/1912 | Payen | 287—91 |
| 1,431,286 | 10/1922 | Brown | 287—91 |
| 1,974,966 | 9/1934 | McClure | 280—515 |
| 2,179,955 | 11/1939 | Rawnsley | 287—91 |
| 2,404,362 | 7/1946 | Carlson | 280—492 |
| 2,519,460 | 8/1950 | Hansen | 287—91X |

BENJAMIN HERSH, Primary Examiner

JOHN A. PEKAR, Assistant Examiner

U.S. Cl. X.R.

287—91